(12) United States Patent
Steinwender

(10) Patent No.: US 7,588,131 B2
(45) Date of Patent: Sep. 15, 2009

(54) MAGNETORHEOLOGICAL CLUTCH

(75) Inventor: Herbert Steinwender, Liebmannweg (AT)

(73) Assignee: Magna Drivetrain AG & Co KG, Lannach (AT)

( * ) Notice: Subject to any disclaimer, the term of this patent is extended or adjusted under 35 U.S.C. 154(b) by 484 days.

(21) Appl. No.: 11/587,421

(22) PCT Filed: Apr. 29, 2005

(86) PCT No.: PCT/AT2005/000150

§ 371 (c)(1),
(2), (4) Date: Dec. 5, 2006

(87) PCT Pub. No.: WO2005/106275

PCT Pub. Date: Nov. 10, 2005

(65) Prior Publication Data

US 2008/0236976 A1    Oct. 2, 2008

(30) Foreign Application Priority Data

Apr. 30, 2004    (AU) ............... GM 328/2004

(51) Int. Cl.
*F16D 35/00* (2006.01)
*F16D 37/02* (2006.01)
(52) U.S. Cl. ............... 192/21.5; 192/58.41; 188/267.2
(58) Field of Classification Search ............ 192/58.41, 192/58.5; 188/267.1, 267.2; 310/76
See application file for complete search history.

(56) References Cited

U.S. PATENT DOCUMENTS

| 2,709,507 | A | | 5/1955 | Trickey | |
|---|---|---|---|---|---|
| 5,992,582 | A | * | 11/1999 | Lou et al. | 188/267.1 |
| 6,183,386 | B1 | * | 2/2001 | Duggan | 475/84 |
| 2005/0252744 | A1 | | 11/2005 | Steinwender | |

FOREIGN PATENT DOCUMENTS

| EP | 0 940 286 A | 9/1999 |
|---|---|---|
| WO | 2004/018889 A | 4/2004 |
| WO | 2004/040157 A | 5/2004 |

* cited by examiner

*Primary Examiner*—Rodney H Bonck
*Assistant Examiner*—Edwin A. Young
(74) *Attorney, Agent, or Firm*—Harness, Dickey & Pierce, P.L.C.

(57) ABSTRACT

Disclosed is a magnetorheological clutch comprising a stationary part (1), a rotating primary part (2) with primary lamellae (7), and a coaxially rotating secondary part (3) with secondary lamellae (20). An adjustable magnetic field acts upon the magnetorheological fluid. In order to be able to transmit the greatest possible torque in a minimum of space and at minimal power consumption, at least one magnet coil (25) encompassing a first yoke (24a, 24b) is disposed such that primary lamellae (7, 7') and secondary lamellae (20, 20') are located on both sides thereof. The lamellae are made of a material which is provided with moderate magnetic permeability and allows limited short-circuit flux. A second yoke (27, 27') having a face (32, 32') that extends parallel to the lamellae adjoins the outermost lamella on both sides, "outermost" being in relation to the axial direction.

13 Claims, 9 Drawing Sheets

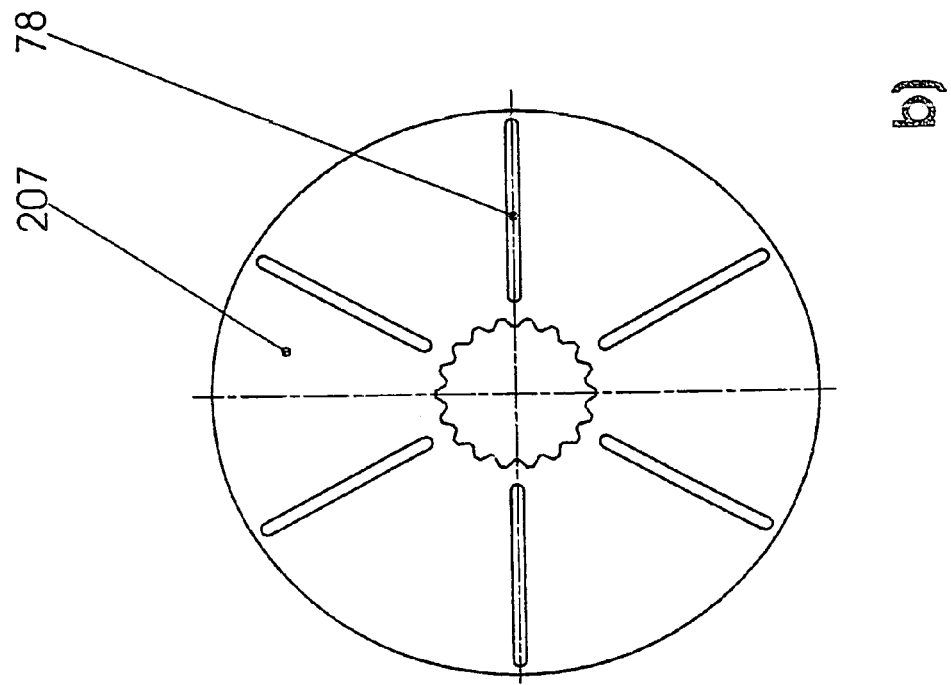
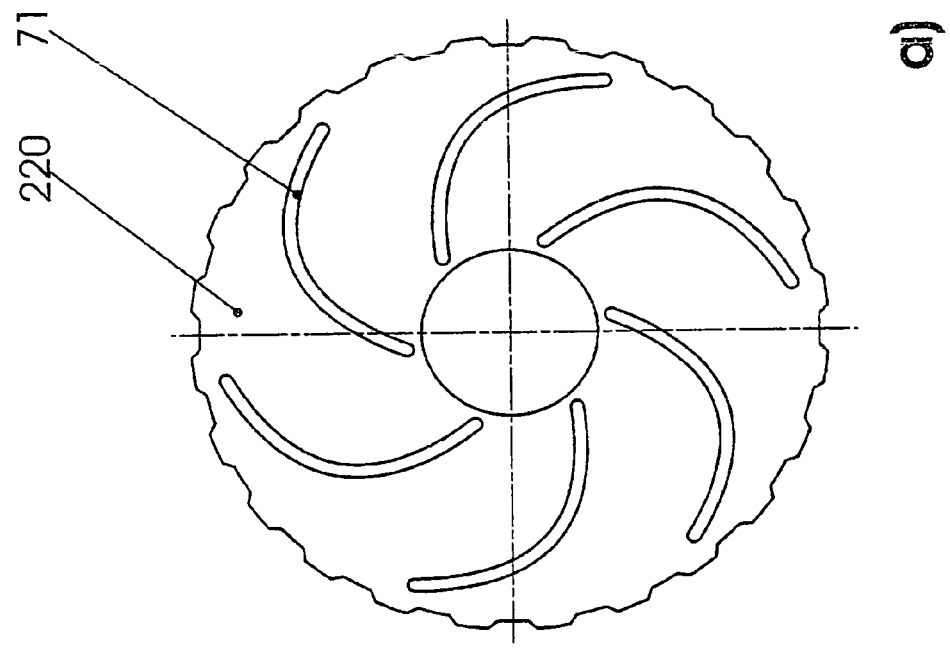
Fig. 9

MAGNETORHEOLOGICAL CLUTCH

CROSS-REFERENCE TO RELATED APPLICATIONS

This application is a National Stage of International Application No. PCT/AT2005/000150, filed Apr. 29, 2005, and which claims the benefit of Austrian Utility Model No. GM 328/2004, filed Apr. 30, 2004. The disclosures of the above applications are incorporated herein by reference.

FIELD

The invention relates to a magnetorheological clutch comprising a stationary part, a primary part having primary disks and a secondary part having secondary disks, wherein at least one of the primary part and the secondary part coaxially rotates relative to the respective other part, with a space containing a magnetorheological fluid being formed between the primary part and the secondary part in which primary disks and secondary disks alternate sequentially in the axial direction and with a regulatable magnetic field acting on the magnetorheological fluid. A magnetorheological fluid is in particular to be understood as magnetizable particles suspended in a liquid or in a gas (in particular air). The primary disks are rotationally fixedly connected to the primary part and the secondary disks to the secondary part.

BACKGROUND

The statements in this section merely provide background information related to the present disclosure and may not constitute prior art.

The power consumption and the constriction size are critical and must therefore be minimized for the use of a clutch of this type in the drivetrain of a power vehicle. There are also further demands: Such a wide regulation range of the transmitted torque that non-slip starting off from a stationary position is possible, on the one hand, and complete separation is (also) possible for noise reasons, on the other hand; and finally fast response to be compatible with electronic driving dynamic controls (ESB, ABS, etc).

A clutch of this type is known from EP 940 286 A2. The magnetic field is generated by a coil fixed with respect to the housing here. An air gap thereby arises between its yoke and the rotating parts, in particular the disks, which has to have a substantial width for tolerance reasons. The magnetic field lines are thereby interrupted and the magnetic field acting on the magnetorheological fluid is substantially weakened. Furthermore, the field lines are relatively long due to the construction of the magnetic coil with its yoke, which further reduces the size of the active part of the magnetic field, that is its part acting on the magnetorheological fluid.

It is furthermore known from EP 940 286 A2 (FIGS.5 and 6) that, at both sides of the clutch, two yokes, of which one is provided with a magnetic coil, form an end face parallel to the disks. The magnetic field passes through the disks, and indeed in the outer region in a magnetic flux direction and in the inner region in the opposite direction. Accordingly, the disks are separated from one another by zones of low magnetic permeability extending in the peripheral direction to prevent a magnetic short-circuit. These zones can be provided by complex and therefore expensive metallurgical measures. In practice, however, they are slits which weaken the disks in the peripheral direction and in the centrifugal direction. This is undesired for a clutch in the drivetrain of a motor vehicle.

SUMMARY

The object underlying the invention comprises improving a clutch of this type such that a torque can be transmitted which is as high as possible in the smallest possible space and with minimal power consumption.

This is achieved in accordance with the invention in that the end faces of the at least one magnetic coil and the first yoke parallel to the disks form a further thickened disk in the space between the customary disks containing a magnetorheological fluid, said further thickened disk being rotationally fixedly connected either to the primary part as a primary disk or to the secondary part as a secondary disk. Less constructional space is taken up overall in the axial direction thanks to this dual function, the magnetic field lines are kept short and the part of the magnetic field active on the clutch is maximized.

The further features also effect a shortening and homogenizing of the magnetic field lines and a maximization of its active part overall. The field lines run at largely the same spacing in one direction in the outer part of the disks and of the first yoke, are reversed at the two outer second yokes and extend in the opposite direction in the interior part. The flux density is thus uniformly distributed.

In a particularly advantageous further development of the invention, the primary disks and the secondary disks are plates comprising a material of moderately magnetic permeability. A restricted magnetic flux is thereby present in the individual disks between the radially outer part and the radially inner part (in which the magnetic field lines extend in the opposite direction). This flux is, however, limited by saturation of the individual disks so that only a very weak magnetic flux is short-circuited in the first disk and the large part of the magnetic flux extends to the next and next but one disk, and so on. The magnetic flux is thus distributed uniformly over all disks in a simple and natural manner by an optimum choice of the magnetic permeability and by the phenomenon of saturation. The disks comprise a uniform, suitably chosen material and can be disks without openings reducing their strength. The material of the disks is selected for this purpose such that its magnetic permeability lies in the range between 0.6 and 1.2 tesla. The magnetic permeability of the magnetorheological fluid also lies in this range.

For the further minimization of the losses due to eddy currents, the yokes and their parts are composed of sheet metal parts or they comprise a material of high magnetic permeability and low electrical conductivity, for instance of a sintered material. Since eddy currents delay the building up of the magnetic field on the release of the clutch, substantially shorter switch-off times are thereby achieved. With a large number of primary and secondary disks, it is recommended to arrange a plurality of first yokes, preferably two first yokes, having at least one magnetic coil in the space containing the magnetorheological fluid. Since the individual coils, which are connected in series, take up less width than a single one with the same field strength, the axial extent of the clutch thereby only increases a very little.

The at least one first yoke can be rotationally fixedly connected either to the primary part or to the secondary part. The assembly, the installation of the coupling and the power supply are, however, simpler if the at least one first yoke is rotationally fixedly connected to the primary part and lines are provided in the primary part for the power supply of sliding contacts fixed with respect to the housing to the magnetic coils.

In a first advantageous and particularly simple embodiment, the first yoke contains a single magnetic coil whose winding axis is the axis of rotation of the clutch.

In a further advantageous embodiment, the first yoke comprises a plurality of winding cores having one magnetic coil each whose winding axis is parallel to the axis of rotation of the clutch and the magnetic coils are distributed uniformly over the respective periphery in an outer row and in an inner row with opposite poles.

In a third advantageous embodiment, the first yoke comprises a plurality of winding cores having one magnetic coil each whose winding axis is parallel to the axis of rotation of the clutch, which are distributed uniformly over the respective periphery and whose poles are alternately opposite, with the zones of low magnetic permeability of the primary disks and of the secondary disks being oriented substantially radially. In this embodiment, the field lines in the two outer second yokes are not deflected in the radial direction, but in the peripheral direction.

Finally, it is still within the framework of the invention that a hollow space is formed in the interior of the primary part which is in communication with the space containing the magnetorheological fluid and which is closed by a spring-loaded piston, whereby pressure fluctuations due to heat expansion in the space can be compensated.

In a further embodiment, the first yoke comprises a plurality of winding cores which each have a magnetic coil, whose winding axis is parallel to the axis of rotation of the clutch, which are distributed uniformly in a row over the periphery and whose poles are alternately opposite, with primary disks and secondary disks being plates comprising a material of high magnetic permeability which are passed through at least partly by substantially radially oriented zones of low magnetic permeability distributed over the periphery. The zones of low magnetic permeability prevent a magnetic short-circuit which would here extend in the peripheral direction due to the alternating arrangement of the oppositely poled magnetic coils.

In an advantageous further development of this variant, the zones of low magnetic permeability of the primary disks and/or of the secondary disks are slits which preferably differ from the radial direction and whose extent is different for the primary disks and for the secondary disks. The spiral shape of the slits approximately corresponds to the blade of a radial pump. The pumping effect thus achieved acts against an unmixing of the magnetorheological fluid. If its shape is different, sliding sections arise with different speeds of adjacent disks, which counters torque fluctuations. The slits could also be replaced by a series of sequential holes, preferably circular holes. The disks would thus be less weakened with respect to their strength, but the magnetic permeability of the zone would be somewhat larger.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 9 is a detail of FIG. 8.

DETAILED DESCRIPTION

Figure 1:
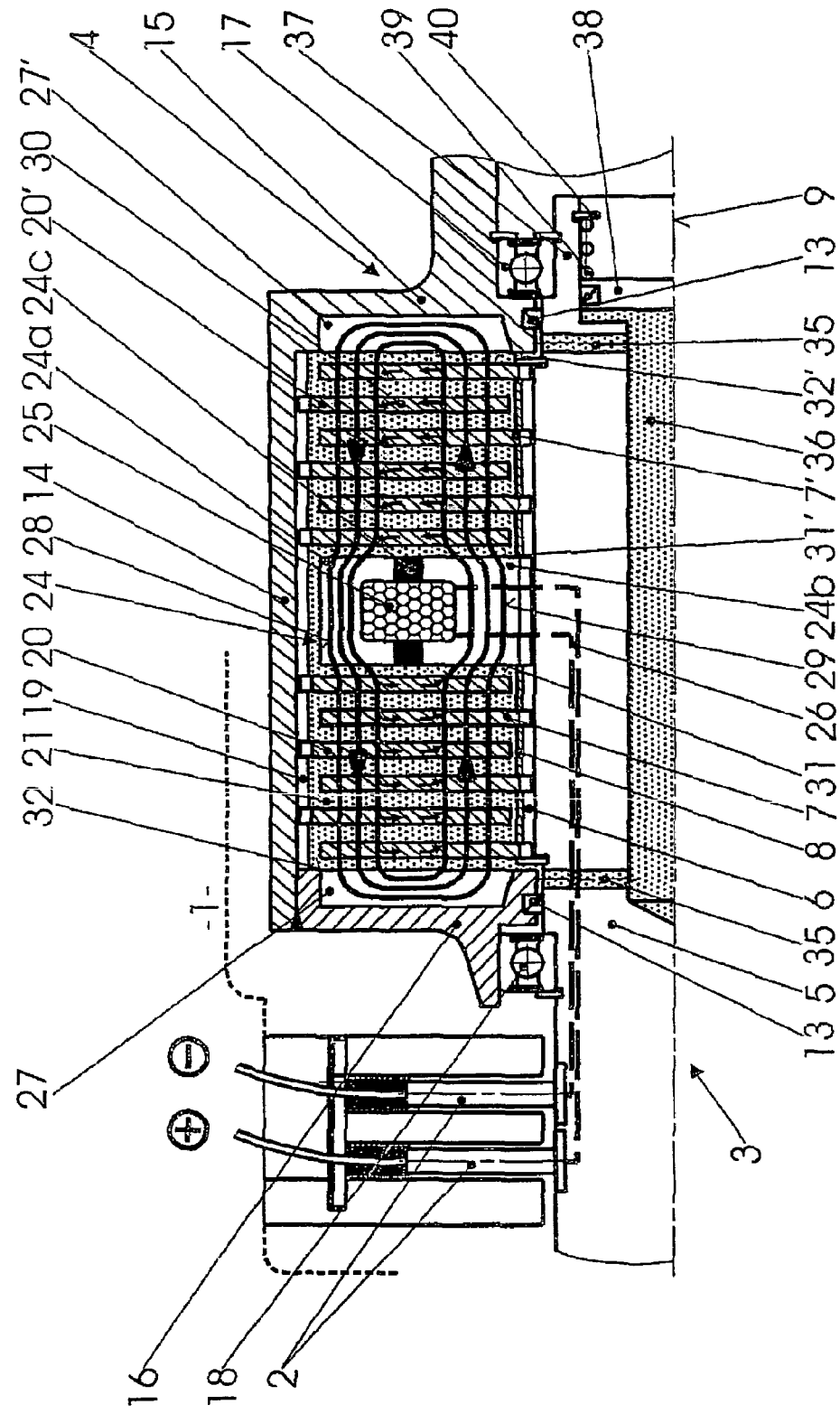
FIG. 1 is a longitudinal section of the clutch in accordance with the invention in a first embodiment.

The following description is merely exemplary in nature and is not intended to limit the present disclosure, application, or uses. It should be understood that throughout the drawings, corresponding reference numerals indicate like or corresponding parts and features.

In FIG. 1, the stationary part 1 is only indicated by a chain-dotted line. Sliding contacts 2 for the power supply are fastened to it. A primary part 3 and a secondary part 4 are located in the interior of the stationary part 1, of which a respective one is driving and the other is driven to the degree determined by the power supply via the sliding contacts 2. The bearings of the primary part 3 and of the secondary part 4 in the stationary part 1 are not shown. The primary part 3 is formed by a primary shaft 5 with whose coupling teeth 6 primary disks 7, 7' are rotationally fixedly connected with their corresponding coupling teeth 6". Ring-like spacers 8 are provided between the primary disks 7, 7'. The axis of rotation common to the primary part 3 and to the secondary part 4 is marked by 9.

The secondary part 4 engages around the primary part 3. It comprises a cylindrical jacket 14 whose cover surfaces 15, 16 are made as bearing plates and contain the bearings 17, 18 which ensure centering between the primary part 3 and the secondary part 4. The cylindrical jacket 14 of the secondary part 4 has a clutch toothed arrangement 19 on its inner side which establishes a rotationally fixed connection to secondary disks 20 which in turn have corresponding clutch teeth 19". The space 21 between the secondary part 4 and the primary shaft 5 is sealed by means of seals 13 and contains a magnetorheological fluid. The latter comprises magnetizable particles suspended in a liquid or in a gas (in particular air). The primary part 3 and the secondary part 4 comprise a material of low magnetic permeability.

Both the primary disks 7 and the secondary disks 20 comprise a material with a maximum magnetic permeability which lies between 0.6 and 1.2 tesla. In this context, the maximum magnetic permeability corresponds to the magnetic saturation of a material (one also speaks of "saturation induction"). Suitable materials are, for example, sintered iron-nickel or nickel-iron alloys such as are marketed by the company Vakuumschmelze under the names "Mumetall"® or "Permenorm"®. "Mumetall"® reaches the saturation state at 0.75 to 0.8 tesla; "Permenorm"® at 1.2 tesla. For comparison: a steel usually used for disks of this type has a magnetic saturation range of more than 2 tesla; a customary construction steel one of around 1.7 tesla; aluminum or plastic one of practically zero; and a magnetorheological fluid one of 0.8 to 1 tesla.

A first yoke 24 is located approximately in the center between the primary disks 7, 7' and the secondary disks 20, 20'. It comprises an outer part 24a and an inner part 24b, both made of a material of high permeability and of a zone 24c of very low permeability (almost zero) therebetween. The first yoke 24 is here rotationally fixedly connected to the primary part 3 via a clutch toothed arrangement 6. A magnetic coil 25, which here has the common axis of rotation 9 as the winding axis, is at the interior of the two yoke parts 24a, 24b. Here, the winding axis is to be understood as the center line of the cylinder on which the windings of the magnetic coil lie. The power supply to the magnetic coil 25 takes place from the sliding contacts 2 via lines 26 in the interior of the primary part 3.

The yoke 24 has an end face 31 on both sides which is parallel to the disks 20, 20'. Two yokes 27 (left in the Figure) and 27' (right in the Figure) are provided in the cover surfaces 15, 16 of the secondary part 4, are of a material of high magnetic permeability and are let into the bearing plates 15, 16. The field built up on a current flow through the magnetic coil 25 is symbolized by the field lines 28, 29. The outer field lines 28 extend in a direction parallel to the axis of rotation 9, are deflected inwardly in the second yoke 27 and extend in the opposite direction as field lines 29. There is no magnetic short circuit in the yoke itself. The magnetic field lines 23 are thereby introduced into the disk package in an equidistant and parallel manner and are diverted in the second yoke 27, 27'. It can be recognized that these field lines travel the largest part of their path through the space 21 containing the disks 7, 20 and the magnetorheological fluid without any air gap. Short-circuit field lines 30 branch off from the field lines in the individual disks and in the intermediate spaces filled with magnetorheological fluid. The magnetic flux along the short-circuit field lines 30 is limited by saturation so that the weak magnetic short-circuit fluxes are distributed uniformly over all disks.

The space 21 is connected to a compensation space 36 via radial bores 35 to compensate for temperature-induced volume changes of the magnetorheological fluid. Said compensation space is a blind bore in the primary shaft 5 which ends at its open side in a compensation cylinder 37 in which a compensation piston 38 is acted on by a compression spring 39 which is in turn supported at a circlip 40. When the fluid expands, the piston 38 is displaced outwardly against the force of the spring 39.

Figure 2:
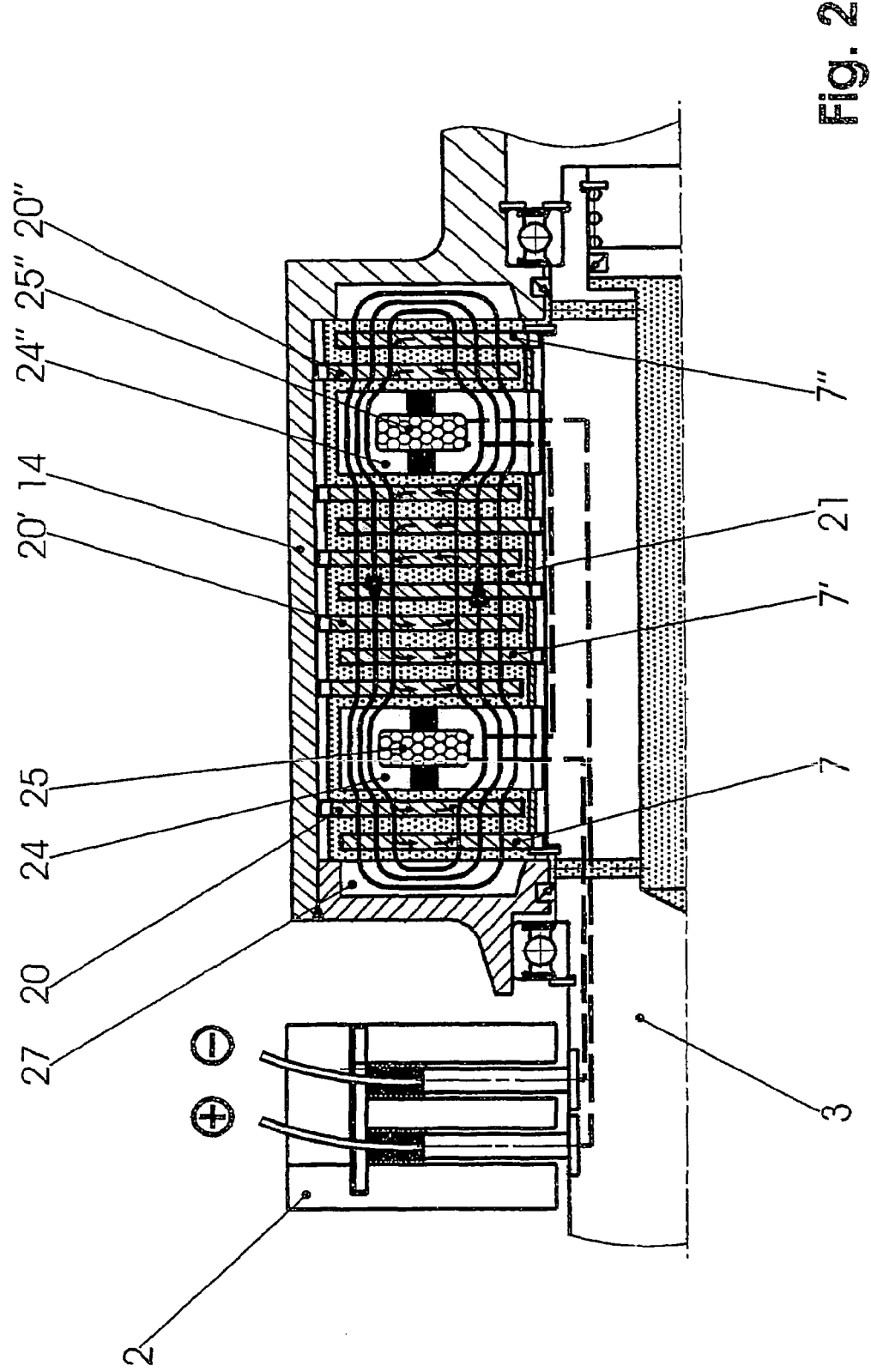
FIG. 2 is a variant of FIG. 1.

The variant of FIG. 2 only differs from this in that two first yokes 24', 24" are present instead of a single one. Viewed from left to right, the second yoke 27 is followed by primary disks 7 and secondary disks 20, then by a first yoke 24, then primary disks 7' and secondary disks 20', then a further first yoke 24", primary disks 7" and secondary disks 20" and finally the right hand second yoke 27'.

Figure 3:
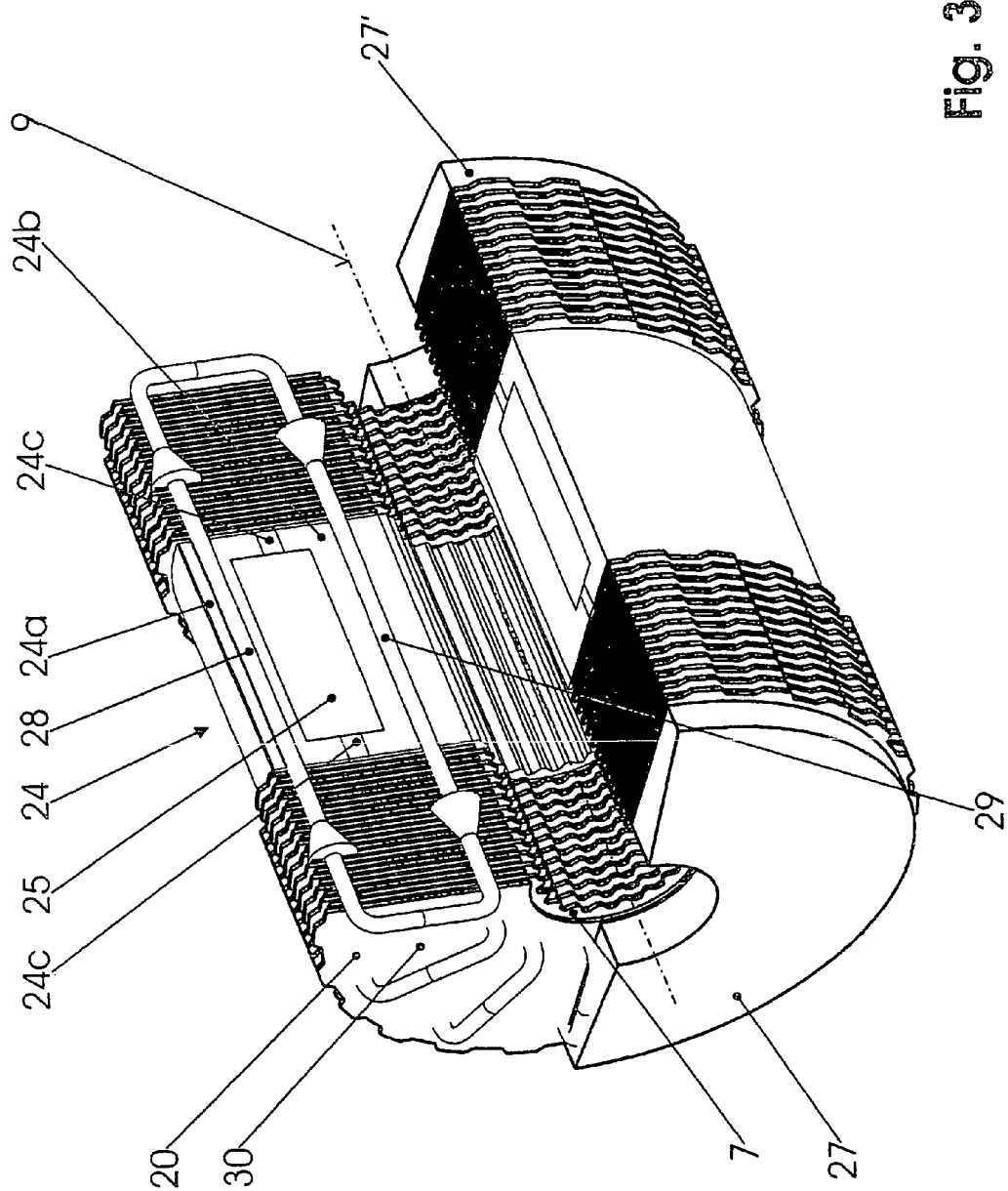
FIG. 3 is an axonometric view of FIG. 1, without a secondary part.

FIG. 3 shows the embodiment of FIG. 1, with the primary shaft, however, being omitted and only the secondary disks 20 of the secondary part being able to be recognized. The field lines 28, 29 are again drawn in symbolic manner; the cones which they pass through are their direction arrows.

Figure 4:
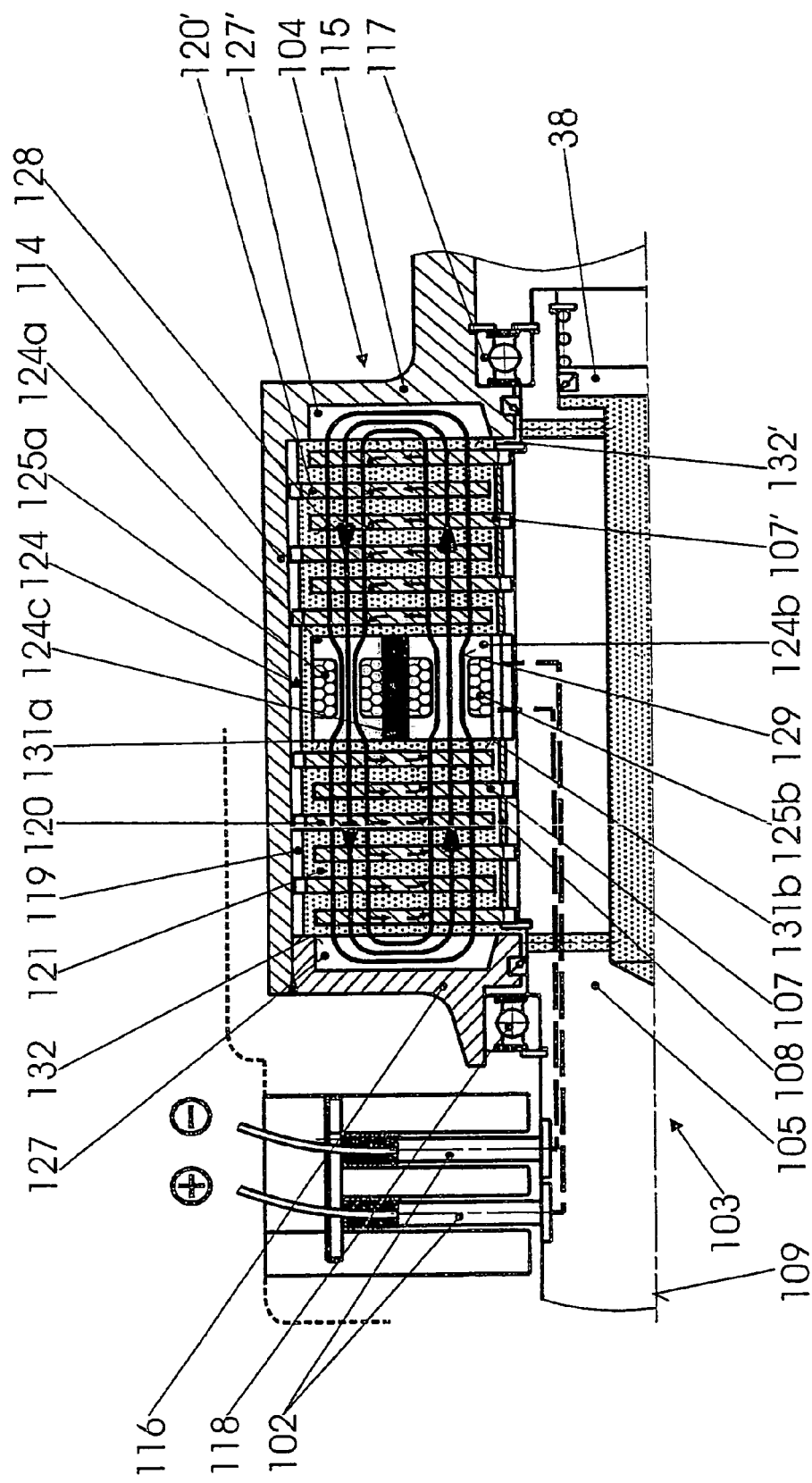
FIG. 4 is as FIG. 1, but in a second embodiment.
Figure 5:
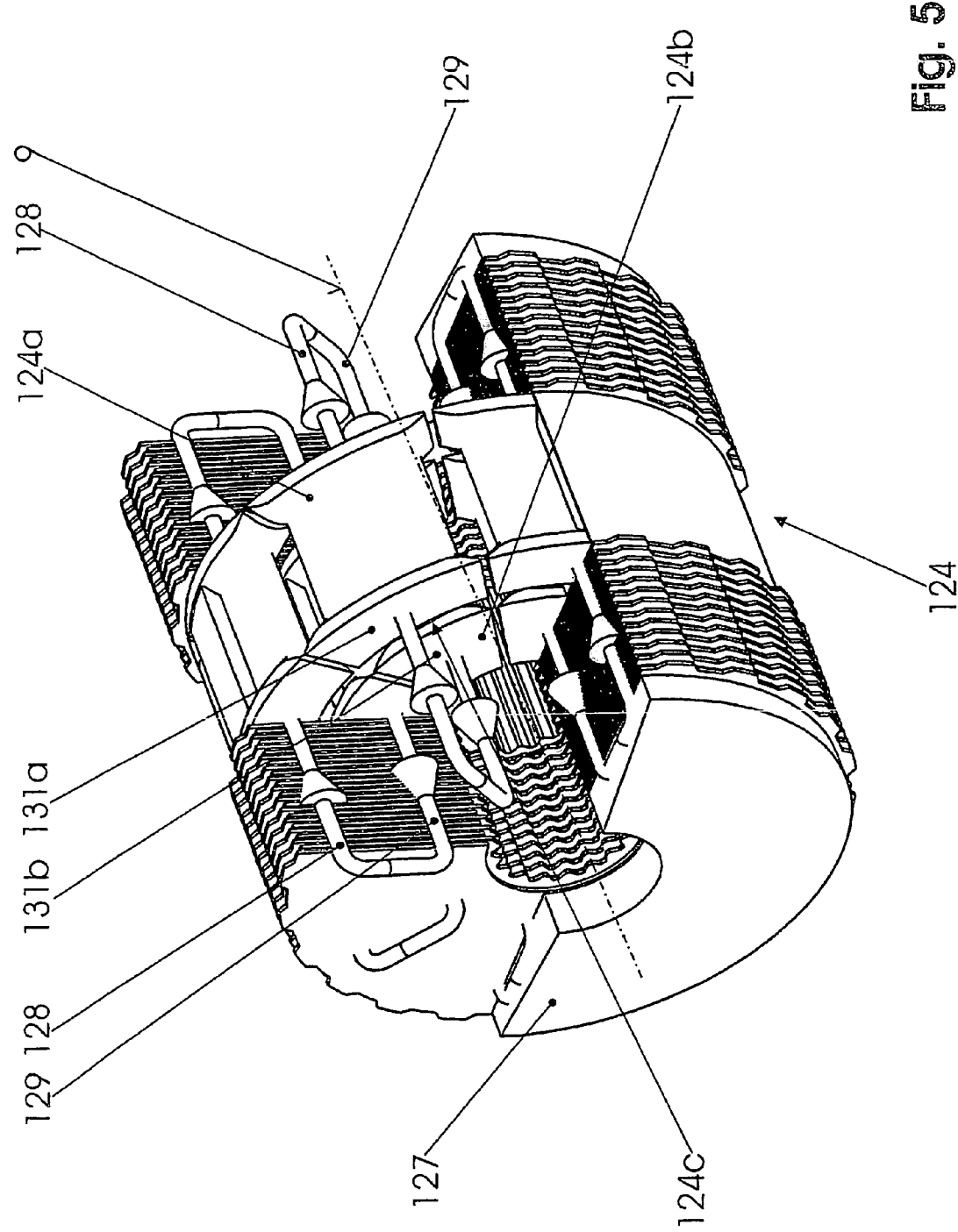
FIG. 5 is an axonometric view of FIG. 4.
Figure 6:
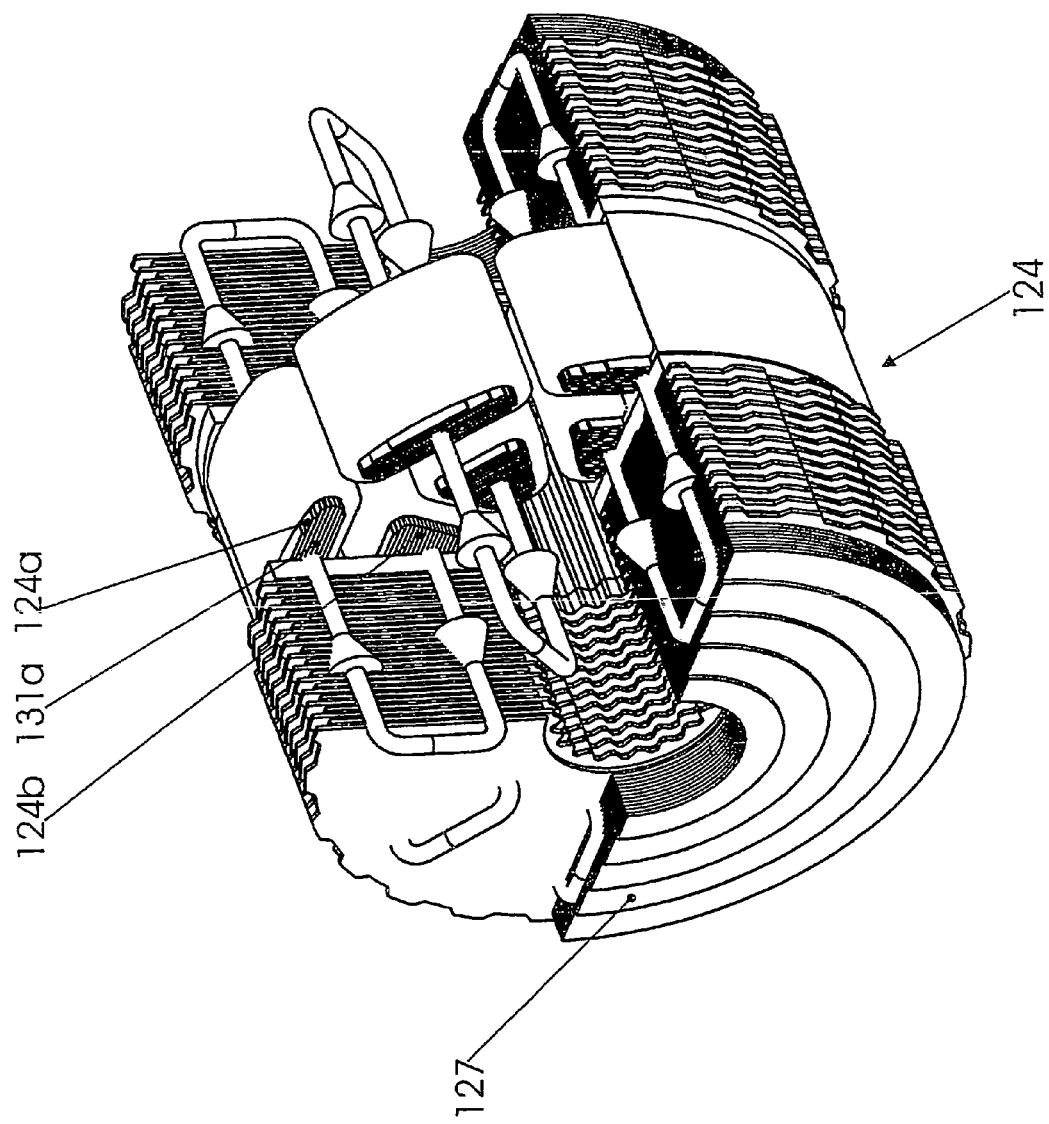
FIG. 6 is a variant of FIG. 5.

The second embodiment of FIG. 4 differs from FIG. 1 by the different arrangement of parts of the first yoke and of the corresponding coil, which is better expressed in the axonometric view of FIG. 5. The reference numerals are those of FIG. 1, but increased by 100 here. The first yoke 124 here comprises a plurality of winding cores 124a (outer row) and 124b (inner row) which are distributed in two rows over the periphery with a zone of low magnetic permeability 124c therebetween. Each of the winding cores is wound around individually here and is thus encompassed by its own magnetic coil whose winding axis is parallel to the axis of rotation 9 and is in the winding cores 124a and 124b. The winding axes in FIG. 6 lie in the field lines 128, 129 drawn in tube-like manner. It is important that the magnetic coils 125a (outer row) and 125b (inner row) are oppositely poled. In FIG. 6, only the winding cores can be seen; the magnetic coils themselves have been omitted. All the winding cores with their magnetic coils are here overmolded by a plastic mass, whereby the zones 124c of low magnetic permeability also result automatically.

The variant of the second embodiment (FIG. 6) differs from FIG. 5 only in that the winding cores 124a, 124b of the first yoke 124 are formed by sheet metal packages to reduce the arising of eddy currents. Eddy currents prevent the fast degradation of a magnetic field which is, however, necessary for the fast disengagement of a magnetorheological clutch. The layers of the "sheet-metalled" winding cores are laid so that they are not cut by the field lines, that the field lines thus move along their planes.

The third embodiment (FIG. 7) only differs from the preceding embodiment in construction in the design of the first yoke 224. The reference numerals are increased by 200 here. The first yoke 224 comprises a series of winding cores 224a, 224b distributed uniformly over the periphery. They are here only arranged in a peripheral row, but the windings of adjacent winding cores 224a, 224b are each poled oppositely. The windings themselves are again omitted for reasons of illustration. It can, however, be recognized on the basis of the field lines 228, 229 that the winding core 224a is flowed through in one direction and the adjacent winding core 224b is flowed through in the reverse direction by the field lines 229, 228. The reversal takes place in the yokes 227, 227' provided at both sides, with the difference that the deflection does not take place in the radial direction here, but in the peripheral direction. The individual winding cores 224a, 224b with the magnetic coils surrounding them are again overmolded with a plastic of low magnetic permeability, whereby the separation zones 224c also result. The disks 207, 220 here comprise a material of moderate magnetic permeability and are non-pierced disks which permit a limited magnetic short circuit.

Figure 7:
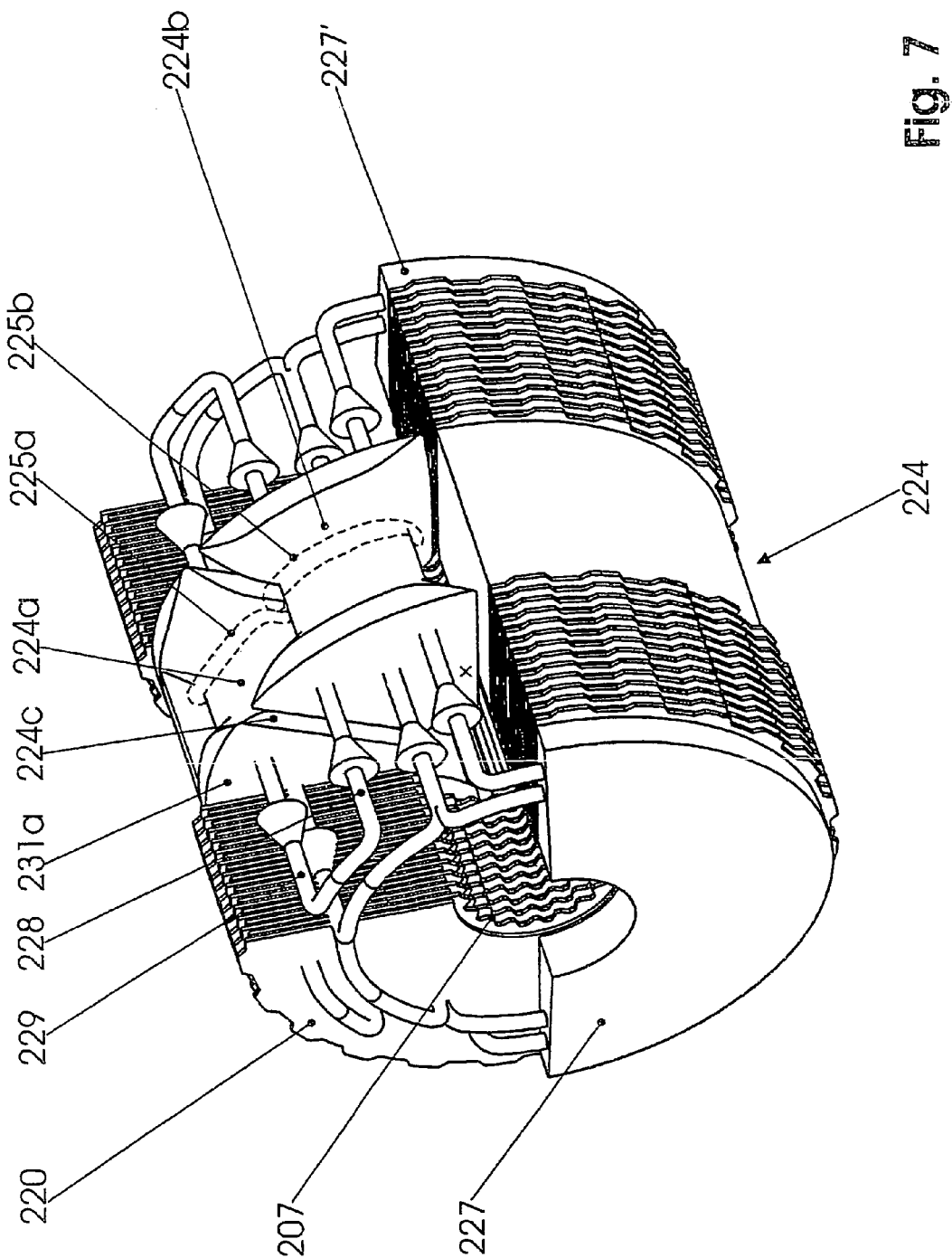
FIG. 7 is as FIG. 1, but in a third embodiment.
Figure 8:
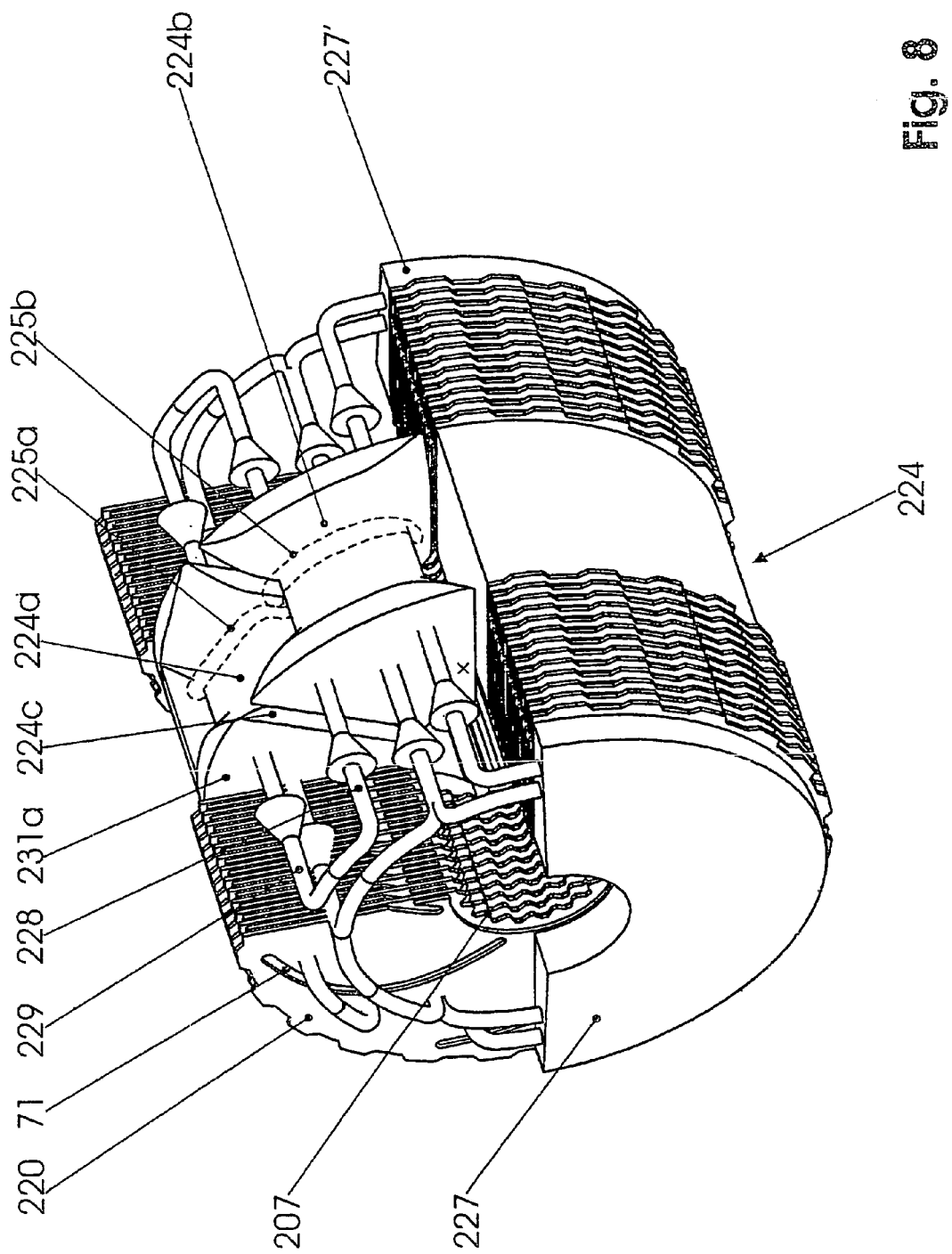
FIG. 8 is as FIG. 1, but in a fourth embodiment.

The fourth embodiment (FIG. 8) differs from FIG. 7 only in that the disks comprise a material of high magnetic permeability and have substantially radially aligned zones 71 of very low magnetic permeability which can be made, for example, as in FIG. 9.

FIG. 9 finally shows, at the left, (a) a secondary disk 220 with substantially radially extending slits 71 as zones of low magnetic permeability and, at the right, a primary disk 207 with radially extending slits 78 as zones of low magnetic permeability. The spiral extent of the slits 71 corresponds approximately to the blades of a centrifugal pump. The pumping effect thus achieved acts against an unmixing of the magnetorheological fluid. With different speeds of adjacent disks, sliding sections arise, which counters torque fluctuations. The slits could also be replaced by a series of sequential holes, preferably circular holes. The disks would thus be less weakened with respect to their strength, but the magnetic permeability of the zone would be somewhat larger.

The description is merely exemplary in nature and, thus, variations that do not depart from the gist of the present disclosure are intended to be within the scope of the invention. Such variations are not to be regarded as a departure from the spirit and scope of the present disclosure.

The invention claimed is:

1. A magnetorheological clutch comprising a stationary part, a primary part having primary disks and a secondary part having secondary disks wherein at least one of the primary part and the secondary part coaxially rotates relative to the respective other part, with a space containing a magnetorheological fluid being formed between the primary part and the secondary part in which the primary disks and the secondary disks alternate sequentially in the direction of the common axis and with a regulatable magnetic field acting on the magnetorheological fluid, the magnetorheological clutch further comprising:

a) at least one magnetic coil having a first yoke arranged in the space containing the magnetorheological fluid such that the primary disks and the secondary disks are located at both sides of the first yoke;

b) end surfaces of the first yoke at both sides parallel to the primary disks and to the secondary disks from which the magnetic field lines exit or into which they enter substantially at right angles and comprises parts of opposite poles separated from one another by zones of low magnetic permeability;

c) second yokes, each having an end face parallel to the disks, located adjacent to the outermost disks in the axial direction.

2. A magnetorheological clutch in accordance with claim 1, wherein the primary disks and the secondary disks are plates comprising a material of moderate magnetic permeability.

3. A magnetorheological clutch in accordance with claim 2, wherein the magnetic permeability of the material of the primary disks and secondary disks lies in the range between 0.6 and 1.2 tesla.

4. A magnetorheological clutch in accordance with claim 2, wherein the first yoke comprises a plurality of winding cores having one respective magnetic coil whose winding axis is parallel to the axis of rotation of the clutch and which are distributed uniformly over the periphery in a row and whose poles are alternately opposite.

5. A magnetorheological clutch in accordance with claim 1, wherein the yokes and its parts are composed of one of sheet metal parts and a material of high magnetic permeability and low electrical conductivity.

6. A magnetorheological clutch in accordance with claim 1, wherein a plurality of first yokes having at least one magnetic coil are arranged in the space containing the magnetorheological fluid such that primary disks and secondary disks are located on both sides of each yoke.

7. A magnetorheological clutch in accordance with claim 1, wherein at least one first yoke is rotationally fixedly connected to the primary part; and lines for a power supply are provided in the primary part.

8. A magnetorheological clutch in accordance with claim 1, wherein the first yoke contains a magnetic coil whose winding axis is the axis of rotation of the clutch.

9. A magnetorheological clutch in accordance with claim 1, wherein the first yoke comprises a plurality of winding cores having one respective magnetic coil whose winding axis is parallel to the axis of rotation of the clutch and which are distributed uniformly over the respective periphery in an outer row and in an inner row and the magnetic coils of the inner row are oppositely poled with respect to the inner coils of the outer row.

10. A magnetorheological clutch in accordance with claim 1, wherein a hollow space in communication with the space containing the magnetorheological fluid is formed in the interior of the primary part and is closed by a piston loaded by a spring.

11. A magnetorheological clutch in accordance with claim 1, wherein the first yoke comprises a plurality of winding cores having one respective magnetic coil whose winding axis is parallel to the axis of rotation of the clutch which are distributed uniformly in a row over the periphery and whose poles are alternately opposite, with primary disks and secondary disks being plates comprising a material of high magnetic permeability which are passed through at least partly by substantially radially aligned zones of low magnetic permeability distributed over the periphery.

12. A magnetorheological clutch in accordance with claim 11, wherein the zones of low magnetic permeability of the primary disks and/or of the secondary disks are slits which differ from the radial direction and whose extent is different for the primary disks and the secondary disks.

13. A magnetorheological clutch in accordance with claim 11, wherein the zones of low magnetic permeability of the primary disks and of the secondary disks comprise a number of sequential holes.

* * * * *